United States Patent [19]

Diaz

[11] 4,304,465
[45] Dec. 8, 1981

[54] ELECTROCHROMIC DISPLAY DEVICE

[75] Inventor: Arthur F. Diaz, San Jose, Calif.

[73] Assignee: International Business Machines Corporation, Armonk, N.Y.

[21] Appl. No.: 89,323

[22] Filed: Oct. 29, 1979

[51] Int. Cl.³ .............................. G02F 1/17; G02F 1/23
[52] U.S. Cl. ..................................... 350/357; 252/408
[58] Field of Search .......................... 350/357; 252/408

[56] References Cited

U.S. PATENT DOCUMENTS

| 3,712,709 | 1/1973 | Kenworthy | 350/357 |
| 4,142,783 | 3/1979 | Engler et al. | 252/408 |

FOREIGN PATENT DOCUMENTS

| 2839223 | 3/1979 | Fed. Rep. of Germany | 350/357 |
| 5235182 | 3/1977 | Japan | 252/408 |
| 2021277 | 11/1979 | United Kingdom | 350/357 |

OTHER PUBLICATIONS

Diaz, A. F., et al., IBM Tech. Discl. Bull., vol. 22, No. 4, pp. 1638, 1939 (Sep. 1979) and No. 3, p. 1188 (Aug. 1979).
Kaufman, F. B., et al., IBM Tech Discl. Bull., vol. 20, No. 5, pp. 2001-2004 (1977).
Diaz, A. F., et al., J.C.S. Chem. Comm., No. 14, pp. 635-636 (Jul. 19, 1979).
Mohilner, D. M., et al., J. Am. Chem. Soc., vol. 84, pp. 3618-3622 (1962).
Bacon, J., et al., J. Am. Chem. Soc., vol. 90, No. 24, pp. 6596-6599 (1968).

*Primary Examiner*—Teddy S. Gron
*Attorney, Agent, or Firm*—Joseph E. Kieninger

[57] ABSTRACT

An electrochromic display device has a polymer film on the display electrode. In the writing step the polymer film on the display electrode is oxidized to a colored, non-transparent form. In the erasing step the polymer film is reduced to a neutral transparent form. A film of polyaniline is used in a preferred embodiment. A film of polypyrrole is used in another embodiment.

9 Claims, 1 Drawing Figure

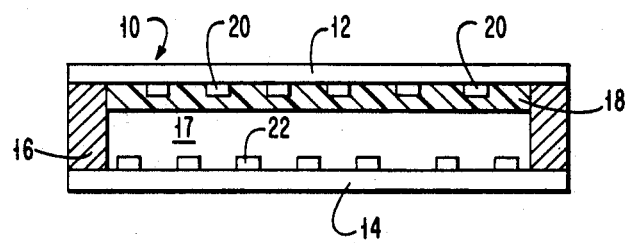

ELECTROCHROMIC DISPLAY DEVICE

DESCRIPTION

Technical Field

This invention relates to an electrochromic display device and more particularly to a device having a polymer film upon the display electrode.

It is a primary object of this invention to provide an improved electrochromic display device.

It is another object of this invention to provide an electrochromic display device in which the color change does not have to involve a color forming material in the electrolyte solution.

It is still another object of this invention to provide an electrochromic display device in which the electroactive material does not migrate from the display electrode to the counter electrode.

It is yet still another object of this invention to provide an electrochromic display device that will operate with an electrolyte containing water and oxygen.

BACKGROUND ART

For the purposes of this specification, an electrochromic display device is a device wherein the display effect is achieved as a consequence of a redox reaction caused by the passage of a charge between a display electrode and a counter electrode, both in contact with a suitable electrolyte. In examples of a conventional electrochromic display is given in British Pat. No. 1,376,799 wherein the electrolyte includes heptyl viologen dications as the color forming material. Upon the reduction at the display electrode, a purple film which is insoluble in the electrolyte is deposited on the display electrode, that is, the writing step. Oxidation at the display electrode returns the dications to the electrolyte, that is, the erasing step. Thus, by providing a plurality of display electrodes and selectively energizing them, a required display can be generated. Other materials can be used. Development has taken the place of displays which employ redox reactions in organic materials such as tungsten oxide, to achieve the display effect.

The successful operation of electrochromic display devices depends upon the redox reaction of the electrolyte which deposits an insoluble nontransparent material on the display electrode as well as removing that deposited material by a reverse reaction. A very common problem with electrochromic displays involves the migration of the electroactive material, that is, deposited material, from the display electrode to the counter electrode.

BRIEF DESCRIPTION OF THE DRAWINGS

In the accompanying drawing forming a material part of this disclosure:

FIG. 1 is a schematic cross-section through an electrochromic display device according to the invention.

DISCLOSURE OF THE INVENTION

For further comprehension of the invention, and of the objects and advantages thereof, reference will be had to the following description and the accompanying drawings, and to the appended claims in which the various novel features of the invention are more particularly set forth.

Accordingly, the invention comprises an electrochromic display device including a hollow panel enclosing a suitable electrolyte and having one face transparent, a counter electrode located on the inner surface of the one face, a plurality of display electrodes on the opposite innerface of the panel, and a polymer film on the display electrodes characterized in that the color and transparency of the polymer film is changed by varying or switching the potential of the display electrodes. A film of polyaniline is used in a preferred embodiment. A film of polypyrrole is used in another embodiment.

BEST MODE FOR CARRYING OUT THE INVENTION

Referring to the drawing which shows a schematic cross-section of a display device according to the invention, a panel 10 consists of parallel sheets 12 and 14 of glass or other suitable material sealed together at the periphery by a sealing glass 16 or some other bonding material to enclose a hermetic space 17. Techniques for making such a panel are well established and will not further be described. At least sheet 14 of the panel is transparent since the device is intended to be viewed from that side. The drawing is not to scale, the sheets 12 and 14 are about 6 mm thick and are spaced apart by 2 mm.

A thin polymer film 18 is deposited on the display electrodes 20 by conventional methods such as described in IBM Technical Disclosure Bulletin Vol. 22 No. 4, page 1639, September 1979. Display electrodes 20 are on the inner face of the panel 12. Counter electrodes 22 are on the inner face of panel 14. Positioned in the hermetic space 17 is a conventional electrolyte. Electrical connection to the display electrodes 20 and the counter electrode 22 are effected by means of a conventional edge connection arrangement as is well known in the art.

The polymer film 18 needs to be sufficiently insoluble in the electrolyte so that the film 18 remains on the display electrodes 20. Typically, the polymer film 18 is of high molecular weight and insoluble in conventional solvents. Polymer films 18 formed by the aforementioned deposition method have good electrical contact with the display electrodes 20. A typical composition of a polymer film 18 formed by the deposition method is described in detail in J.C.S., Chem. Comm. p 635, 1979 and is included herein by reference thereto. Such compositions contain of the order of 70% polymer and 30% anion salt, for example, $BF_4$ anion.

The thickness of the polymer film is between $0.01\mu$ to $5\mu$ with a preferred thickness being 0.05 to $1\mu$. Typically, there is a tradeoff between color contrast and switching speed. The thinner films provide faster switching speeds while the thicker films provide higher color contrast.

In the writing step the polymer film 18 is oxidized to a colored, nontransparent form. In the erasing step the polymer film 18 is reduced to a neutral transparent form. The writing and erasing steps are effected by varying or switching the potential of the display electrodes.

The polymer film 18 may be any polymer whose oxidation-reduction reaction can be conveniently driven in a conventional electrolyte, for example, between $-2$ V and $+1.5$ V. Polymers which fulfill this requirement are unsaturated and have extended $\pi$ system. Examples of such polymers are polyaniline, polypyrrole, and polynaphthylamines. These three polymer films can be modified structurally by substituting on the repeating monomer. Examples of modifying polypyrrole would be N-phenyl polypyrrole and N-methyl polypyrrole. The substituent groups may also be placed on the other positions of the repeating monomer.

EXAMPLE 1

A thin film less than 0.1 micron thick of polyaniline on a platinum display electrode was repeatedly cycled for twenty hours between $-0.2$ V and $+1.0$ V vs NaCE in an aqueous solution exposed to the atmosphere. During this process the film changed from the transparent yellow to black repeatedly. Switching occurred within 0.1 seconds.

EXAMPLE 2

A thin film of polypyrrole 0.1 microns thick was deposited on the backside of a display electrode surface and was repeatedly cycled for eight hours between $+0.5$ V and $-0.8$ V vs NaCE in an organic solution in a closed system. During this process the film changed from a nontransparent, black film to a clear, pale yellow film. The film remained localized on the electrode and eliminated the usual problem of migration of the electroactive material to the counter electrode. Switching occurred within 1 to 10 milliseconds.

EXAMPLES 3 and 4

Polypyrrole polymer films containing the N-substituents N-phenyl and N-methyl were cycled for four hours as in Example 2, but exposed to the atmosphere, and the film color changed from a nontransparent black film to a clear pale yellow film. Switching occurred within 0.1 second.

EXAMPLE 5

A thin film of polynaphthyldiamine was cycled for two hours as in Examples 3 and 4 and the film color changed from a nontransparent black film to a clear pale yellow film.

In contrast to prior art electrochromic display devices which relied upon the electrolyte to provide the species which darkened the display electrode, the devices in accordance with this invention utilize a thin polymer film that changes color and transparency when the potential of the display electrodes is varied or switched.

Industrial Applicability

Electrochromic devices made in accordance with this invention are useful in most applications that display devices can be used. For example, they may be used in watches and hand calculators.

Another aspect of this invention would be to incorporate an electrolyte in the polymer film 18 so that the film 18 is in contact with both the display and counter electrodes.

While I have illustrated and described the preferred embodiments of my invention, it is to be understood that I do not limit myself to the precise constructions herein disclosed and the right is reserved to all changes and modifications coming within the scope of the invention as defined in the appended claims.

I claim:

1. An electrochromic display device comprising
   a hollow panel enclosing an electrolyte and having a first transparent face and a second face,
   a counter electrode located on the inner surface of said transparent face,
   a display electrode on the inner surface of said second face, and
   a polymer film of a polypyrrole on said display electrode wherein varying the potential of said display electrode causes said polymer film to change in color and transparency.

2. An electrochromic display device comprising
   a hollow panel enclosing an electrolyte and having a first transparent face and a second face,
   a counter electrode located on the inner surface of said transparent face,
   a display electrode on the inner surface of said second face, and
   a polymer film selected from the group consisting of polyaniline and polynaphthylamines on said display electrode wherein varying the potential of said display electrode causes said polymer film to change in color and transparency.

3. A device as claimed in claim 2 or claim 1 wherein said polymer film has a thickness of $0.01\mu$ to $5\mu$.

4. A device as claimed in claim 3 wherein said polymer film has a thickness of $0.05\mu$ to $1\mu$.

5. A device as described in claim 2 wherein said polymer film is a polyaniline.

6. A device as described in claim 2 wherein said polymer film is a polynaphthylamine.

7. A device as described in claim 1 wherein said polypyrrole film contains a N-substituent.

8. An electrochromic display device comprising
   a hollow panel enclosing an electrolyte and having a first transparent face and a second face,
   a counter electrode located on the inner surface of said transparent face,
   a display electrode on the inner surface of said second face, and
   a polymer film of N-phenyl polypyrrole on said display electrode wherein varying the potential of said display electrode causes said polymer film to change in color and transparency.

9. An electrochromic display device comprising
   a hollow panel enclosing an electrolyte and having a first transparent face and a second face,
   a counter electrode located on the inner surface of said transparent face,
   a display electrode on the inner surface of said second face, and
   a polymer film of N-methyl polypyrrole on said display electrode wherein varying the potential of said display electrode causes said polymer film to change in color and transparency.

* * * * *